(12) United States Patent
You et al.

(10) Patent No.: US 10,692,397 B2
(45) Date of Patent: Jun. 23, 2020

(54) SMART NASOMETER

(71) Applicants: POSTECH ACADEMY-INDUSTRY FOUNDATION, Pohang-si (KR); INDUSTRIAL COOPERATION FOUNDATION OF CHONBUK NATIONAL UNIVERSITY, Jeonju-si (KR); CHONBUK NATIONAL UNIVERSITY HOSPITAL, Jeonju-si (KR)

(72) Inventors: Heecheon You, Pohang-si (KR); Myoung-Hwan Ko, Jeonju-si (KR); Jong-Kwan Park, Jeonju-si (KR); Younggeun Choi, Pohang-si (KR); Hyun Gi Kim, Wanju-gun (KR); Han Soo Lee, Busan (KR); Gradiyan Budi Pratama, Pohang-si (KR); Min-Jung Yu, Jeonju-si (KR); Ki Wook Kim, Jeonju-si (KR); Yun Ju Jo, Gunsan-si (KR); Jin Kook Lee, Jeonju-si (KR)

(73) Assignees: POSTECH ACADEMY-INDUSTRY FOUNDATION, Pohang-si (KR); INDUSTRIAL COOPERATION FOUNDATION OF CHONBUK NATIONAL UNIVERSITY, Jeonju-si (KR); CHONBUK NATIONAL UNIVERSITY HOSPITAL, Jeonju-si (KR)

(*) Notice: Subject to any disclaimer, the term of this patent is extended or adjusted under 35 U.S.C. 154(b) by 296 days.

(21) Appl. No.: 15/686,207

(22) Filed: Aug. 25, 2017

(65) Prior Publication Data

US 2018/0061272 A1    Mar. 1, 2018

(30) Foreign Application Priority Data

Aug. 25, 2016 (KR) .................. 10-2016-0108208
Aug. 24, 2017 (KR) .................. 10-2017-0107302

(51) Int. Cl.
*G09B 19/04* (2006.01)
*G10L 15/22* (2006.01)
(Continued)

(52) U.S. Cl.
CPC .............. *G09B 19/04* (2013.01); *A63F 13/85* (2014.09); *G10L 15/22* (2013.01);
(Continued)

(58) Field of Classification Search
CPC ....... G09B 19/04; A61B 5/4803; A61B 5/682; A61B 2505/09; G10L 25/00; G10L 15/22
See application file for complete search history.

(56) References Cited

U.S. PATENT DOCUMENTS

2002/0087103 A1  7/2002  Fletcher et al.
2004/0083093 A1* 4/2004  Lee .......................... G10L 17/26
                                                      704/206
(Continued)

FOREIGN PATENT DOCUMENTS

KR    10-1999-0030683    5/1999
KR    10-2015-0124561    11/2015

*Primary Examiner* — Jerry-Daryl Fletcher
(74) *Attorney, Agent, or Firm* — Lex IP Meister, PLLC

(57) ABSTRACT

A smart nasometer according to an embodiment of the present invention includes: a hardware unit worn on a head of a user for measuring nasal and oral sounds and providing feedback for the user; and a computational unit for receiving and processing speech signals of the nasal and oral sounds measured by the hardware unit, wherein the hardware unit includes: a microphone unit for separately measuring the nasal and oral sounds in a non-touched state of the user's philtrum, wherein the computational unit includes: a nasalance adjustment unit for adjusting a nasalance of the nasal and oral sounds measured by the microphone unit.

13 Claims, 12 Drawing Sheets

(51) Int. Cl.

| | | |
|---|---|---|
| *H04R 1/40* | (2006.01) | |
| *H04R 1/08* | (2006.01) | |
| *G10L 21/0208* | (2013.01) | |
| *H04R 1/10* | (2006.01) | |
| *A63F 13/85* | (2014.01) | |
| *G10L 25/21* | (2013.01) | |
| *G10L 25/78* | (2013.01) | |
| *G10L 25/66* | (2013.01) | |
| *G09B 5/06* | (2006.01) | |
| *H04R 3/00* | (2006.01) | |

(52) U.S. Cl.
CPC ............ *G10L 21/0208* (2013.01); *H04R 1/08* (2013.01); *H04R 1/1008* (2013.01); *H04R 1/1091* (2013.01); *H04R 1/406* (2013.01); *G09B 5/06* (2013.01); *G10L 25/21* (2013.01); *G10L 25/66* (2013.01); *G10L 25/78* (2013.01); *H04R 3/005* (2013.01); *H04R 2201/107* (2013.01)

(56) References Cited

U.S. PATENT DOCUMENTS

| | | | | |
|---|---|---|---|---|
| 2010/0235170 A1* | 9/2010 | Rothenberg | ........... | G09B 19/04 704/270 |
| 2011/0082697 A1* | 4/2011 | Rothenberg | ........... | A61B 7/003 704/244 |
| 2011/0313689 A1 | 12/2011 | Holley et al. | | |

* cited by examiner

SMART NASOMETER

CROSS-REFERENCE TO RELATED APPLICATION

This application claims priority to and the benefit of Korean Patent Application Nos. 10-2016-0108208, and 10-2017-0107302 filed in the Korean Intellectual Property Office on Aug. 25, 2016, and Aug. 24, 2017, the entire contents of which are incorporated herein by reference.

BACKGROUND OF THE INVENTION

(a) Field of the Invention

The present invention relates to a nasometer, and more specifically, to an apparatus for facilitating measurement and treatment of patients with resonance disorder.

(b) Description of the Related Art

Resonance disorder is a speech disorder and often results in hypernasality or hyponasality due to cleft palate including submucous cleft palate, adenoid hypertrophy, or various neurological causes.

Representative treatment methods of resonance disorder include a feedback method using auditory, tactile, and/or visual stimuli, a compensatory method, and a pharyngeal muscle strengthening method using a continuous positive airway pressure (CPAP) machine in conjunction with an apparatus for measuring nasal and oral sounds separately such as a nasometer and a See-Scape nasal sound feedback device.

FIG. 1 shows use of a conventional nasometer for measurement and training for resonance disorder.

The first nasometer for measurement of nasalance was developed in 1987 by Kay Elemetrics Corp. (Lincoln Park: N.J., USA). The measure nasalance used to indicate the severity of a patient with resonance disorder reflects the ratio of sound energy from the mouth and that from the nose during speech and its specific metrics include mean nasalance, maximum nasalance, and minimum nasalance.

A nasometer, a device of computer-based quantitative measurement for nasalance, provides objective information of nasalance, is simple and easy to use, allows a comparison of a measurement result with corresponding normative data, and is used to help modify a resonance pattern through visual feedback (Awan et al., 2010). Although nasalance data have been collected by many studies from participants in various age groups using a nasometer, a sophisticated discriminant model has not been established by comparing nasalance measurements of resonance disorder patients with those of the healthy.

Nasalance is measured using a nasometer by the following procedure: run the application program of the nasometer, ask the user wearing the head gear of the nasometer to read sentences provided by the therapist, measure the energy of nasal sound and that of oral sound using the nasal and oral microphones attached above and below the separator of the nasometer, respectively, and calculate the ratio of the nasal sound energy to a sum of the nasal sound energy and the oral sound energy.

A conventional nasometer has problems in terms of convenience, portability, and feedback. First, the microphones and the separator of the conventional nasometer cause discomfort to the user because the parts of signal amplification and conversion are embedded in the bulky microphone part and the microphone part is mounted to the large separator which is made of metal. Particularly, because the metal separator supported by the head gear of the nasometer is required to be in contact with the philtrum, significant discomfort is often experienced at the head and philtrum of the user and the natural movement of the mouth of the user is disturbed when measuring energies of nasal and oral sounds in speaking. Second, while the conventional nasometer is used in hospitals or clinic centers under the guidance of doctors and therapists, it cannot be used in daily life in real time due to lack of portability. Lastly, while the conventional nasometer can measure oral and nasal sounds through the microphones, it does not have a speaker so that the user cannot recognize his/her voice by real-time sound feedback. Therefore, discomfort caused while wearing the head gear of the nasometer for a long period of time and boredom caused due to simple and repetitive measurement of speaking without any audio feedback make the conventional nasometer ineffective for motivated, voluntary, and systematic treatment for resonance disorder.

SUMMARY OF THE INVENTION

The present invention is intended to provide a nasometer which can be used conveniently and comfortably and provide real-time feedback for the user without losing accuracy in nasalance measurement and to integrate the nasometer to quantitative treatment data in a database (DB) in conjunction with serious games for customized treatment based on the severity of resonance disorder and motivated treatment for resonance disorder.

An exemplary embodiment of the present invention provides an apparatus for measurement and treatment for resonance disorder consisting of a hardware unit worn on the head of the user for measuring nasal and oral sounds of the user and providing feedback for the user, a computational unit for receiving and processing speech signals measured by the hardware unit, a microphone unit included in the hardware unit for measuring nasal and oral sounds of the user's speech while the philtrum is not touched with a separator, and a nasalance adjustment unit included in the computational unit for adjusting the nasalance of the speech measured by the microphone unit.

An application unit including a serious game which provides feedback for the user using nasal and oral speech signals processed by the computational unit and a database unit storing data produced by the application unit and providing feedback to the user or a clinician may be further included.

A wireless transmitting and receiving unit for wirelessly transmitting and receiving speech signals processed by the computational unit and interoperating with the hardware unit and the database unit may be further included.

The hardware unit may include a head gear unit having adjustment functions of length and angle to fit the size of the user's head and a speaker unit covering the user's ear, having an adjustment function of angle, and providing the user with real-time feedback of speech signals processed by the computational unit.

The distance of the microphone unit from the user's face may be adjusted.

The microphone unit may include a separator positioned without touching the philtrum and two microphones placed above and below the separator to measure nasal and oral sounds separately.

The microphone unit may include a body to which the two microphones are supported and the separator can be mounted on and detached from the body.

The nasalance adjustment unit may include an algorithm which adjusts a nasalance value measured while the separator is not touched to the philtrum to a nasalance value which is not different from that measured while the separator is touched to the philtrum.

A sound energy adjustment ratio is a value obtained by dividing a sound energy of a first speech signal measured by the microphone unit in a state where the separator is touched to the user's philtrum by a sound energy of a second speech signal measured by the microphone unit in a state where the separator is not touched to the user's philtrum, and the algorithm may adjust a nasalance of the second speech signal so that there is no difference between a nasalance of the first speech signal and the nasalance of the second speech signal by multiplying the sound energy of the second speech signal by the sound energy adjustment ratio.

The computational unit may further include a sound signal amplification unit to amplify speech signals, a sound signal conversion unit to convert speech signals into decibel (dB) values, and a noise filtering unit to exclude speech signals out of the normal speech range.

The sound signal conversion unit may convert a speech signal into a dB value using a logarithmic function.

The noise filtering unit may remove nasal and oral sounds of 50 dB or less measured by the microphone unit.

The application unit may control the serious game interoperating with speech signals processed in real-time by the computational unit.

The embodiment of the present invention has an effect of reducing discomfort when using a nasometer by use of the separator not touched to the philtrum and application of the nasalance adjustment algorithm.

In addition, the embodiment of the present invention has an effect of enhancing therapeutic motivation, sustainable therapeutic activity, customized treatment according to the severity of resonance disorder by use of the serious game-based resonance disorder treatment program.

Further, the present invention can provide a systematic resonance disorder treatment for the user by integrating and managing quantitative therapeutic data in the database unit.

DETAILED DESCRIPTION OF THE EMBODIMENTS

Figure 1:
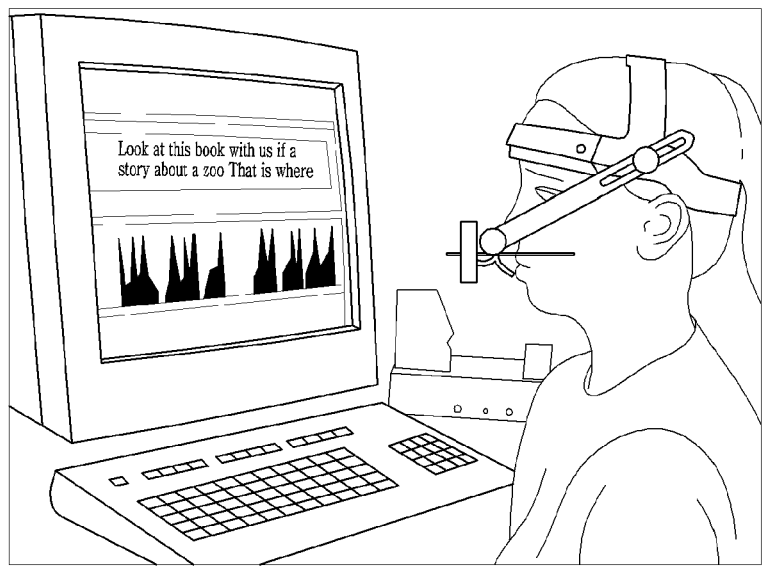
FIG. 1 is a usage illustrative view of the conventional nasometer.

Hereinafter, exemplary embodiments of the present invention will be described in detail with reference to the accompanying drawings so that those skilled in the art may easily practice the present invention.

First, in the drawings, it is to be noted that the same components or parts are denoted by the same reference numerals whenever possible. In the following description of the present invention, a detailed description of known functions and configurations incorporated herein will be omitted so as to avoid obscuring the subject matter of the present invention.

Throughout the present specification, assuming that any part "includes" a certain component, which is not to exclude other components not specifically described against which means that it is possible to further include other components.

The terms "about" and "practically" in the present application for an approximation of numerical value are used to mean the numerical value or one close to the numerical value in reference to manufacturing and material tolerance and to prevent an unscrupulous infringer from unauthorized exploitation of the exact or absolute numerical value disclosed to facilitate understanding the present invention.

A "clinician" described in the specification of the present invention means a person such as a doctor or a therapist who performs measurement and treatment and analyzes results.

A "user" described in the specification of the present invention means a person who uses a system for treatment and training of resonance disorder.

Figure 2:
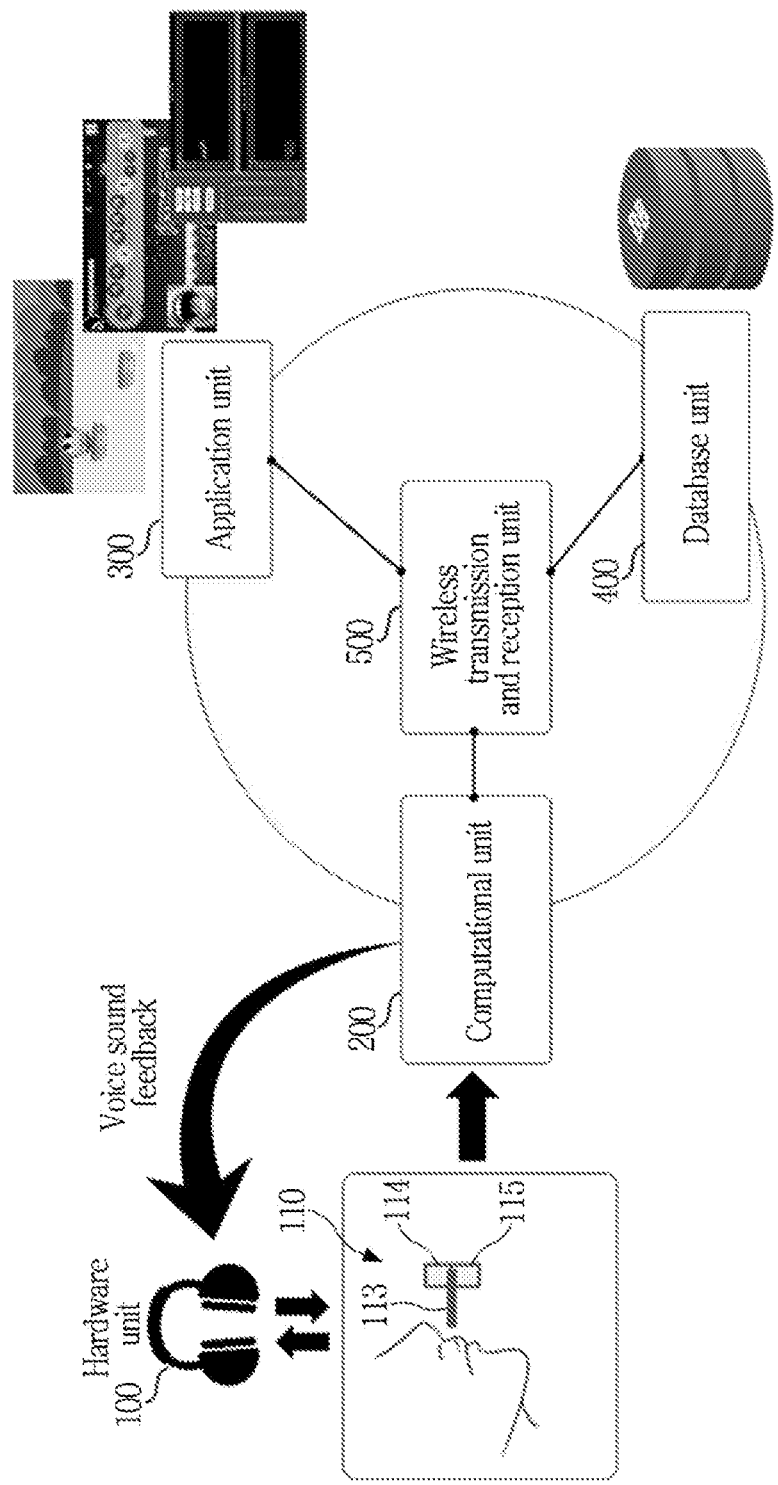
FIG. 2 is an entire schematic diagram of a smart nasometer according to the exemplary embodiment of the present invention.
Figure 3:
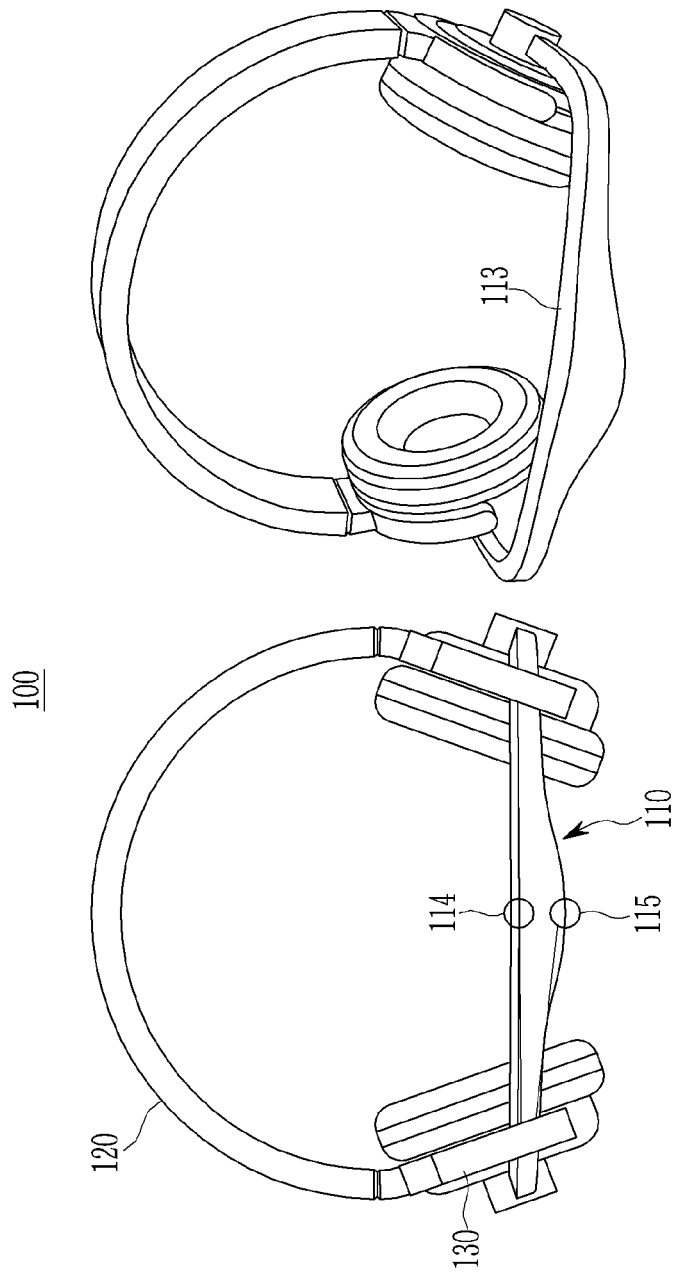
FIG. 3 is a front view and a perspective view of the hardware unit of the smart nasometer according to the exemplary embodiment of the present invention.

FIG. 2 is an entire schematic diagram of the smart nasometer according to the exemplary embodiment of the present invention and FIG. 3 is the hardware unit 100 of the smart nasometer developed in the present invention for measuring and treating resonance disorder.

As shown in FIG. 2 the smart nasometer consists of the hardware unit 100, the computational unit 200, the application unit 300, the database unit 400, and the wireless transmission and reception unit 500. Each unit is interoperating with each other to provide a method for measuring and treating resonance disorder as a whole system. The nasal and oral sounds measured by the hardware unit 100 are processed for signal amplification, noise removal, and nasalance adjustment by the computational unit 200, and then transmitted to the application unit 300 and the database unit 400 installed in the apparatus by the wireless transmission and reception unit 500 without wired connection. In addition, the speech signals processed by the computational unit 200 can provide sound feedback in real time in the hardware unit 100 for the user. The application unit 300 is composed of a serious game and a program which can evaluate speech signals, and a program which saves information of the user and analysis results by a clinician.

Since the serious game aforementioned motivates the user to perform treatment and training and facilitates the treatment by inducing active participation, it is interoperated with the hardware unit 100 to maximize the effect of treatment. The user information stored in the application unit 300 is transmitted to the database unit 400 in real time. Serious game results of the individual user are collected and analyzed in real time and make it easy for a clinician or the user to identify the progress of treatment.

As shown in FIG. 3, the hardware unit 100 of the present embodiment includes the microphone unit 110 for measuring nasal and oral speech signals of the user, the head gear unit 120 for enclosing the user's head and providing a sense of stability when worn, and the speaker unit 130 for providing feedback using speech signals adjusted by the computational unit 200.

Figure 4:
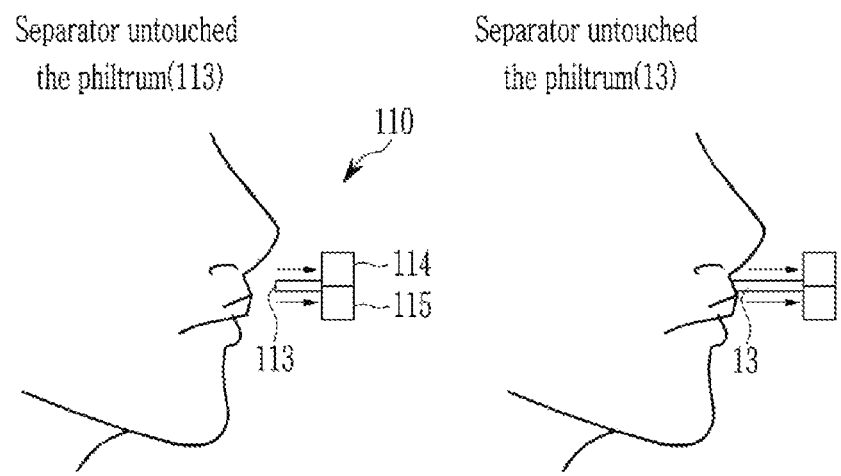
FIG. 4 is a side view which illustrates the difference of the separator which does not touch the philtrum in the microphone unit of the hardware unit according to the exemplary embodiment of the present invention and the separator which does not touch the philtrum in the conventional nasometer.
Figure 5:
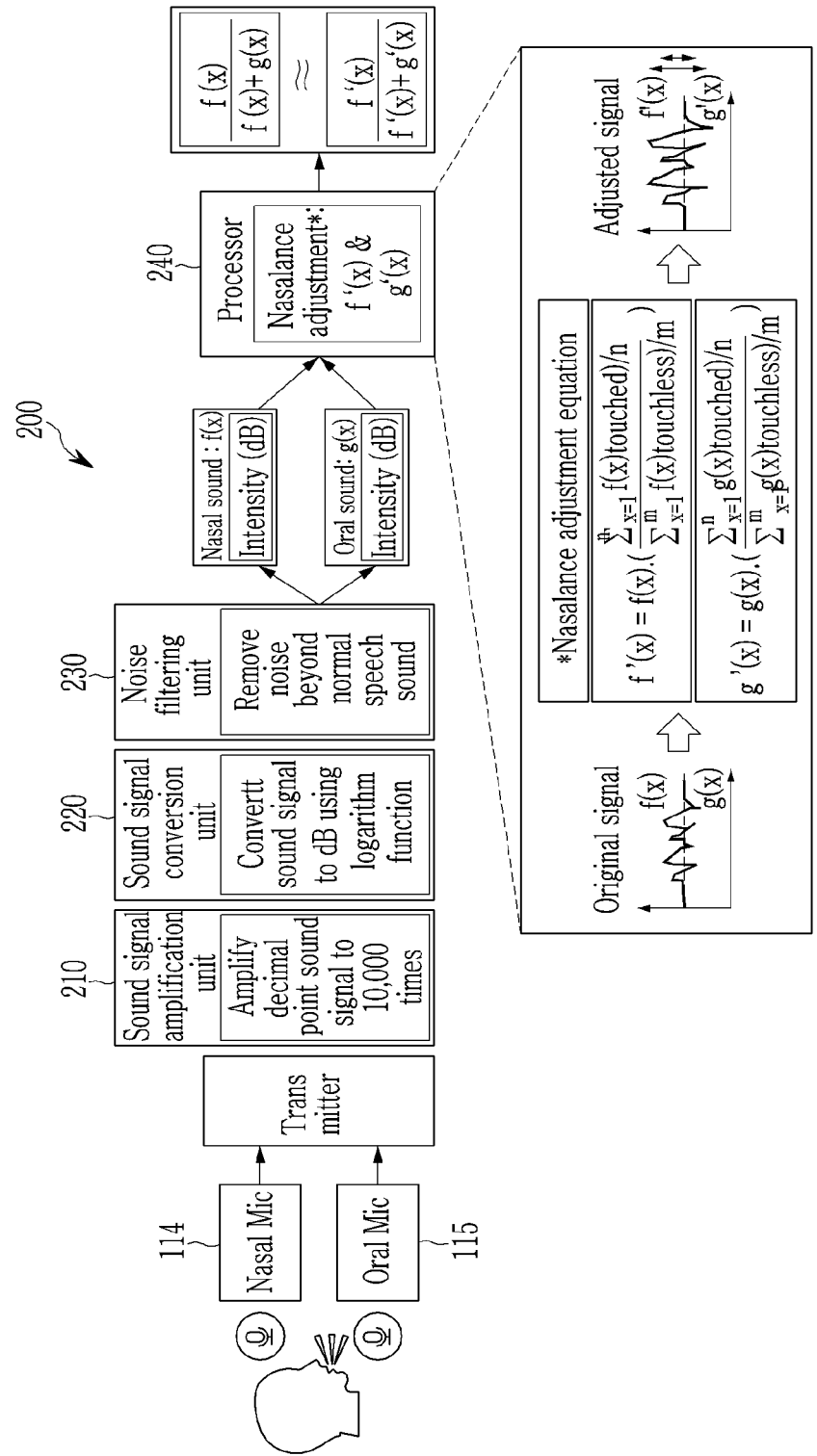
FIG. 5 is a flowchart of the computational unit which provides the signal processing methods and nasalance adjustment algorithm according to the exemplary embodiment of the present invention.

FIG. 4 is a side view illustrating the difference between the separator unit which does not touch the philtrum at the microphone unit of the hardware unit according to the exemplary embodiment of the present invention and the separator which touches the philtrum at the conventional nasometer, and FIG. 5 is a schematic view which illustrates signal processing techniques and algorithms embedded in the computational unit 200 for measuring nasal and oral speech signals, filtering out noise, adjusting the nasal and oral speech signals, and calculating nasalance using the adjusted nasal and oral speech signals.

FIG. 4 is a diagram illustrating the difference of the separator of the hardware unit 100 at the microphone unit in FIG. 3 in the present invention from that of the conventional nasometer. The conventional nasometer causes problems of discomfort from its prolonged use because the separator made of metal touches the philtrum. In contrast, to solve this problem of the conventional nasometer, as shown in FIG. 4, the microphone unit 110 of FIG. 3 provides the separator 113 which does not touch the philtrum. However, the untouched separator 113 to the philtrum may not be able to accurately measure nasalance because oral speech signals and nasal speech signals measured by the two microphones 114 and 115 are not separated completely but mixed with a certain degree. In the present invention, an algorithm is developed for accurate measurement of nasalance by the nasalance adjustment unit 240 which produces a nasalance measurement which is almost equivalent to a nasalance measurement measured with a separator touched with the philtrum.

Further, the microphone unit 110 as shown in FIG. 3 uses small microphones unlike the conventional nasometer to reduce the overall size and weight of the microphone unit 110 and is ergonomically designed considering portability and aesthetics through usability evaluation.

Figure 7:
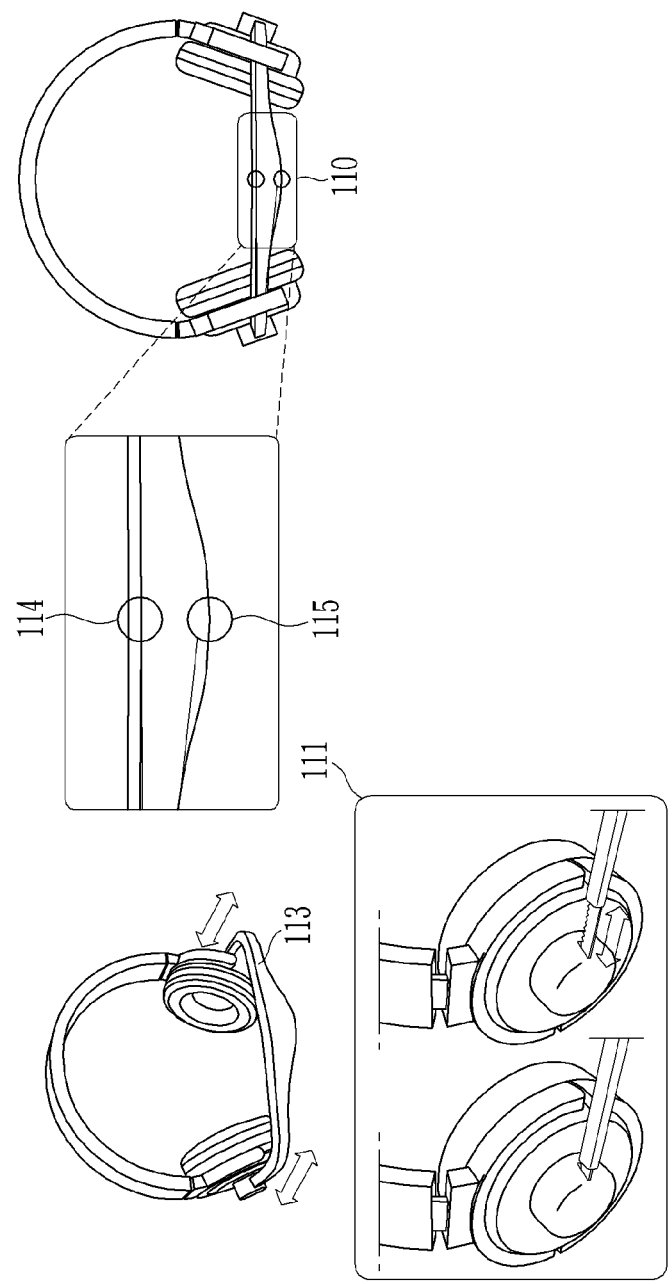
FIG. 7 is an enlarged view of the microphone unit of the hardware unit according to the exemplary embodiment of the present invention.

Further, the microphone unit 110 is designed to be connected to the speaker unit 130 to facilitate the length adjustment 111 in the horizontal direction as shown in FIG. 7. In this case, by using plastic (ABS) materials, the weight of the separator 113 is lighter than the conventional nasometer separator which is made of metal and the hardware unit is designed not to be tilted by gravity when the length adjustment 111 is made to the front to a certain level.

In FIG. 5, the computational unit 200 for measuring a speech signal from the microphone unit and adjusting nasalance consists of the sound signal amplification unit 210 for amplifying a speech signal, the sound signal conversion unit 220 for converting a speech signal into dB, the noise filtering unit 230 for removing a converted signal that is beyond normal speech, and the nasalance adjustment unit 240 by applying an algorithm which adjusts a nasalance value measured while the separator is not touched to the philtrum to a nasalance value equivalent to a nasalance value measured while the separator is touched to the philtrum.

The microphone unit 110 transmits nasal and oral sounds measured by the two microphones to the computational unit 200.

The sound signal amplification unit 210 of the computational unit 200 amplifies a signal received in a decimal dB unit at a rate of 100,000 times to obtain a signal in a range of 0 to 100 dB so that the speech signal can be easily heard and significant signals can be easily selected when removing noise after speech signal conversion.

The sound signal conversion unit 220 converts speech signals measured to speech signals in dB using a logarithmic function to facilitate noise removal for amplified speech signals by the sound signal amplification unit.

In the noise filtering unit 230, by referring to existing studies which report that the speech signal of a human being is in a range of 50 dB to 60 dB (American Speech-Language-Hearing Association [ASHA], 2015; National Institute for Occupational Safety and Health [NIOSH], 1996), a speech signal less than 50 dB or greater than 60 dB is removed. A dB value which is not in the normal speech dB range is removed for accurate measurement of mean nasalance.

Further, in one embodiment of the present invention, a sound energy adjustment ratio is calculated for each of the sound energies measured by the nasal and oral microphones.

Nasalance is calculated by the equation below which compares sound energies measured by the nasal and oral microphones when the user reads standardized sentences while wearing a nasometer head gear. The main measurement metrics include mean nasalance, maximum nasalance, and minimum nasalance.

$$\text{Nasalance}=(\text{nasal sound energy})/(\text{nasal sound energy}+\text{oral sound energy})*100$$

In addition, the sound energy adjustment ratio refers to a ratio of a sound energy measured when the separator 113 of the hardware unit 110 touches the philtrum to that measured when the separator does not touch the philtrum.

In the nasalance adjustment unit 240, the nasalance measured when the separator 113 does not touch the philtrum becomes equivalent to that measured when the separator touches the philtrum by multiplying corresponding sound energy adjustment ratios to nasal and oral sound energy measurements.

Figure 6:
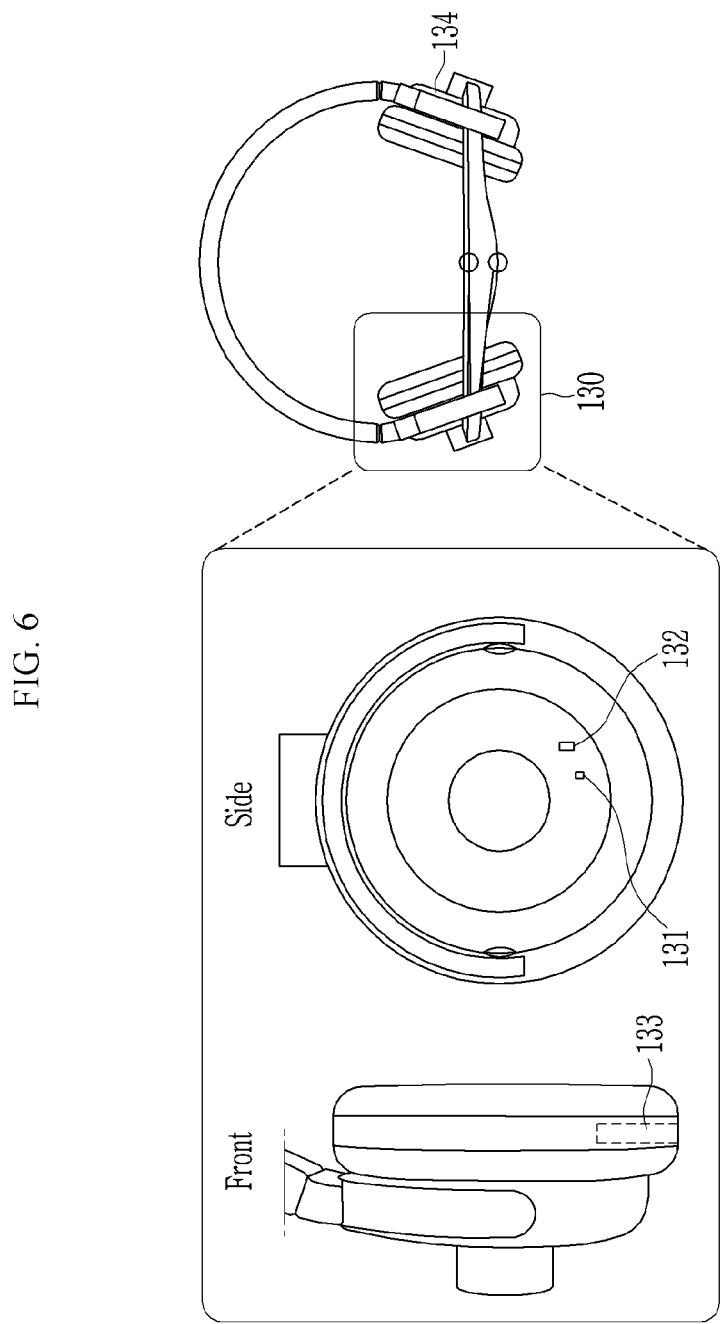
FIG. 6 is an enlarged view of the speaker unit of the hardware unit according to the exemplary embodiment of the present invention.
Figure 8:
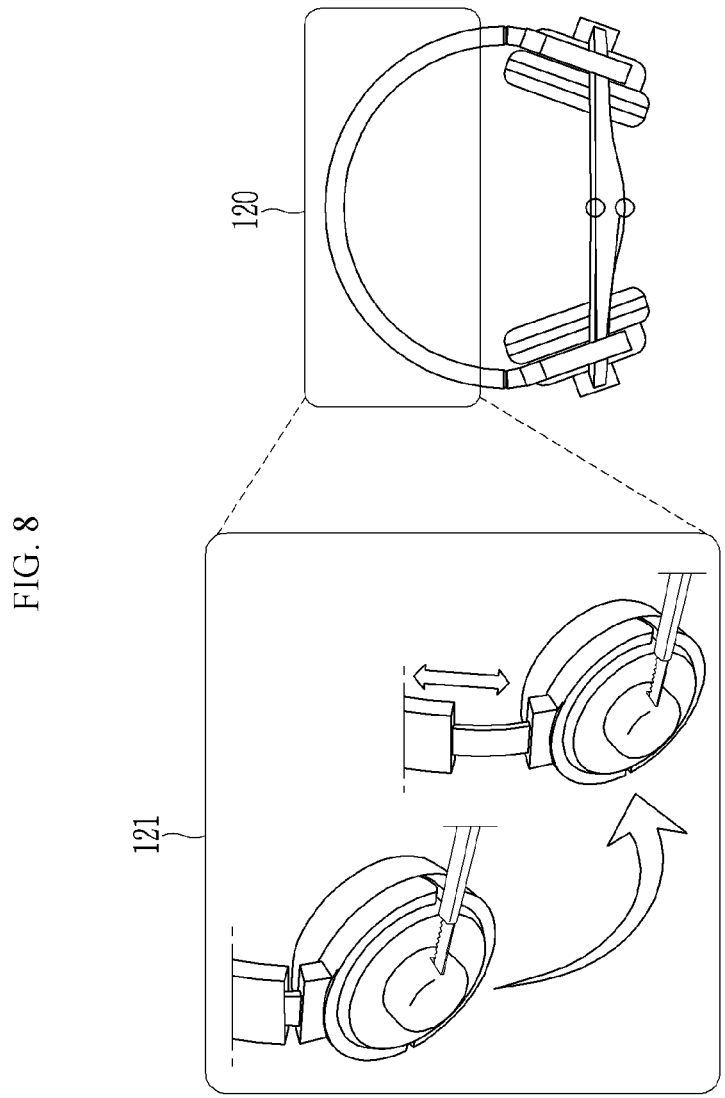
FIG. 8 is an enlarged view of the head gear unit of the hardware unit according to the exemplary embodiment of the present invention.

FIG. 6, FIG. 7, and FIG. 8 show the speaker unit, the microphone unit, and the head gear unit of the hardware unit, respectively, according to the exemplary embodiment of the present invention.

In the speaker unit 130, the user himself/herself can feedback in real time the speech signal adjusted through the computational unit 200.

In the speaker unit 130, a PCB including the power on/off switch button 131, the LED 132 for power on/off identification, and the USB port 133 for power supply is located on the right (or left) speaker section and a rechargeable battery 134 for use of the hardware unit 100 for a long period of time wirelessly is located on the left (or right) speaker section.

In addition, the angle of the speaker unit 130 is adjustable to accommodate various ear angles of users and the size of the speaker unit is designed to cover various ear sizes of users by referring to ear anthropometric statistics of the whole age group.

The head gear unit 120 is designed by considering the sizes of user faces, is designed to be able to adjust the length and angle 121 of the band part for surrounding the head of a user in various size, and is light weight by removing unnecessary designs and using plastic material (e.g., ABS) instead of metal to reduce discomfort from its use for a long period of time.

Figure 9:
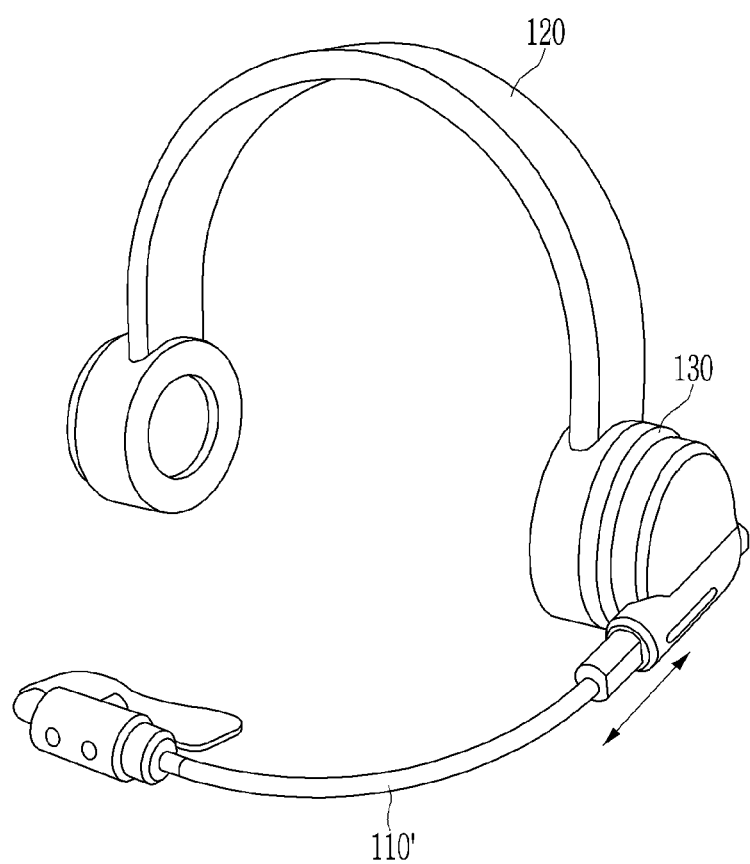
FIG. 9 to FIG. 11 illustrate the hardware unit according to another exemplary embodiment of the present invention.
Figure 10:
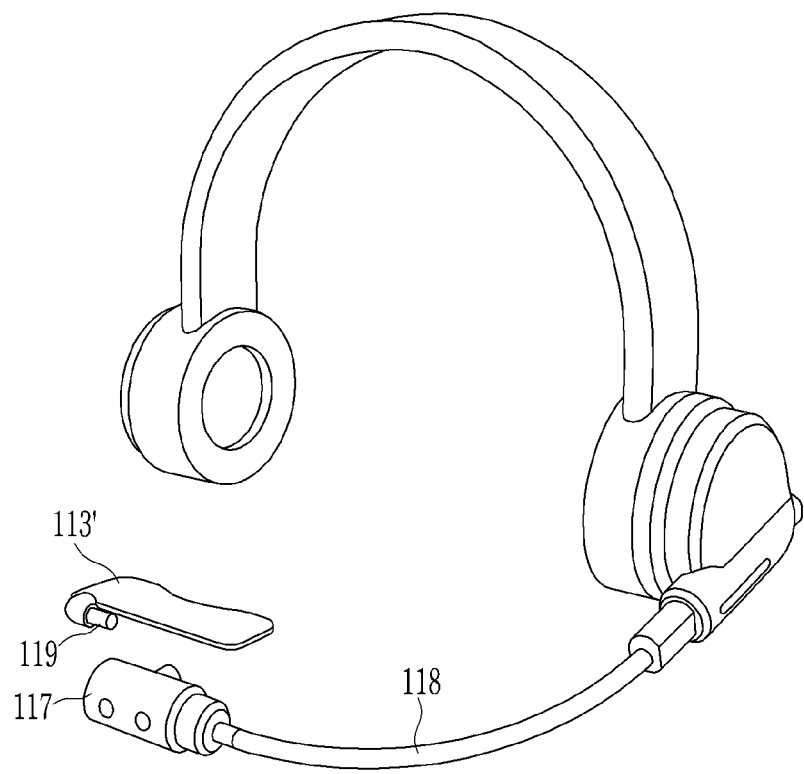
Figure 11:
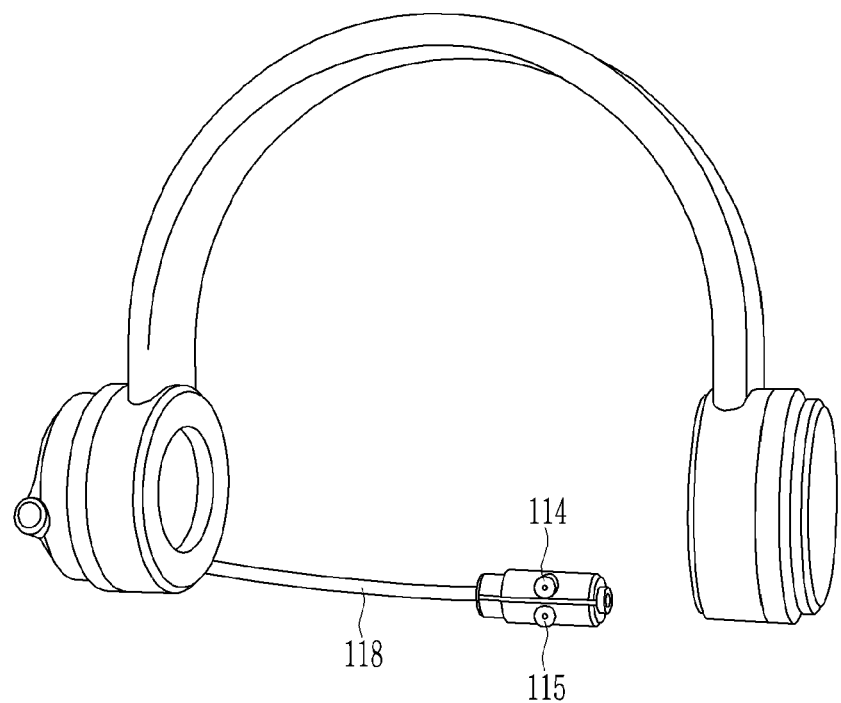

FIG. 9 to FIG. 11 are views of a hardware unit according to another embodiment of the present invention. FIG. 9 to FIG. 11 are the same as the above-described embodiment except for the microphone unit, and therefore only the microphone unit will be described.

Referring to FIG. 9, the microphone unit 110' may be similar to a conventional headset. That is, the microphone unit 110' may be supported by only one side of the speaker unit 130 that covers the ear so that the end of the microphone unit 110' may be positioned close to the user's mouth More specifically, referring to FIG. 10, the microphone unit 110' includes the extension component 118 extending in an arc from the speaker unit 130, the body 117 installed at an end of the extension member 118, and the separator 113' which is detachably installed in the body 117.

The extension component 118 is made of a flexible material so that it can freely bend. However, it can be freely deformed, but it can have some degree of rigidity so that it can maintain its shape without being tilted downward or deformed by gravity. Accordingly, the user may deform the extension member 118 to adjust the position of the extension member 118 to match the shape or size of the user's face, and more particularly the position of the microphones 114 and 115 shown in FIG. 11 can be adjusted. In addition, it is possible to adjust the length in the horizontal direction as shown in FIG. 9.

Referring to FIG. 11, the body 117 is provided at the end of the extension component 118, and the small microphones 114 and 115 are provided at the upper and lower portions of the body, respectively. Here, the two small microphones 114 and 155 can measure the user's nasal and oral sounds, respectively, in the same manner as the above-described embodiment.

Referring to FIG. 10, the separator 113' is detachably formed on the body 117. For example, the separator 113' may be provided at one side thereof with a fitting component 119 that can be fitted into the body 117, but the present invention is not limited thereto, and the separator 113' may be detachably attached to each other in various manners. In addition, the separator 113' may be formed to be small in size, unlike the above-described embodiment. That is, in the above embodiment (see FIG. 3), the microphone unit 110 connects the speaker unit 130 on both sides so that the separator 113' is elongated in an arcuate shape. However, in the present embodiment, the separator 113' may be formed as a small part that can be attached to or detached from the body 117, and may have a size enough to separate the user's nasal and oral sounds, for example, it may be formed in the form of a plate of an elongated size slightly longer than the mouth of the user. At this time, the side edge of the separator 113' facing the user's philtrum may be formed in a concave curved shape at the center.

In the case of the embodiment described in FIG. 9 to FIG. 11, it can be used as a headset for treatment and training for general speech disorders as well as treatment and training for resonance disorder. More specifically, it can be used as a headset for general speech disorder treatment or training by removing the separator 113' from the body 117 and it can be used as a nasometer for treatment or training of resonance disorder by installing the separator 113' to the body 117.

Figure 12:
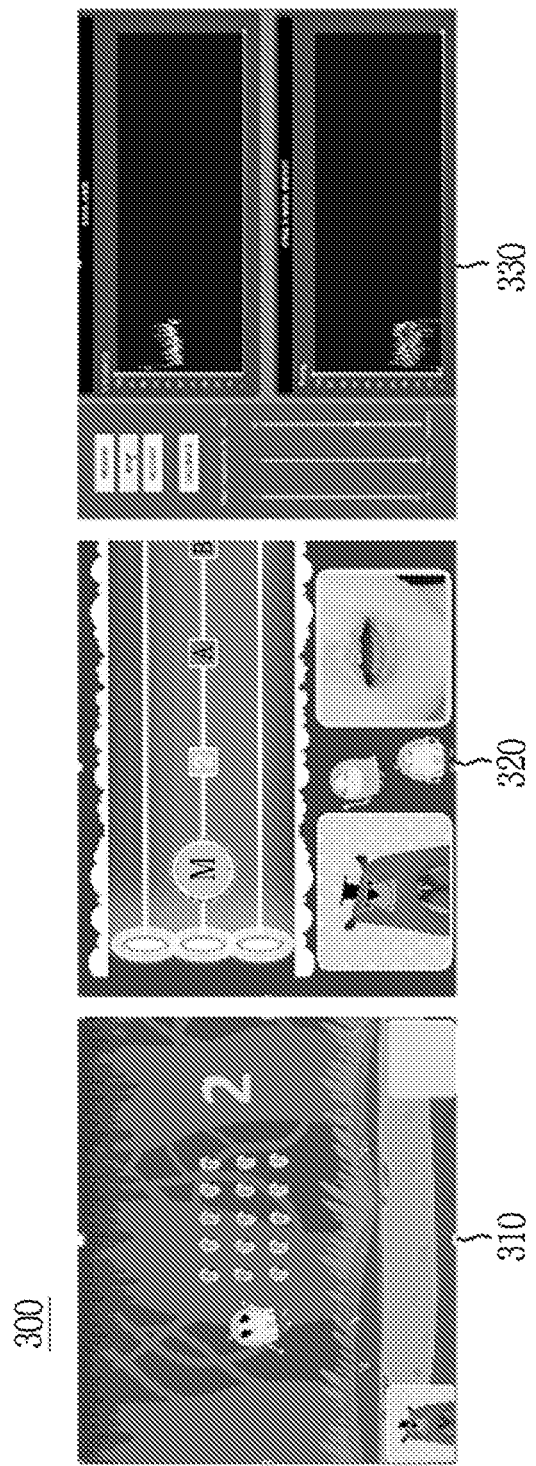
FIG. 12 shows examples of serious game in the application unit of the smart nasometer and a graphic interface of speech signal analysis according to the exemplary embodiment of the present invention.

The application unit 300 shown in FIG. 12 provides an environment in which a user can operate in conjunction with the hardware 100 through providing a serious game and a speech therapy and training program.

A serious game referred to in the present invention is a game in which a game and a device for the game are interoperated with each other. When the device is operated, the result of the device operation is transmitted to an electronic device such as a computer or a smart phone, and the game result is displayed on the game screen.

The serious game included in the application unit 300 helps a user facilitate his/her training, treatment, prevention, and/or learning coping strategies for speech disorders through game play.

An embodiment of the present invention can interoperate with various kinds of serious games. Two examples are jump game and word articulation game.

In the jump game 310, the user shall generate speech signals within a normal range of nasalance to acquire as many coins as possible. If a user achieves a nasalance within the range of normal values, the avatar in the game will jump to collect all the coins. The less the user achieves a nasalance out of the normal range, the less the user collects coins.

In the word articulation game 320, the user shall pronounce words coming from the right to the line on the screen exactly when they come to the line. When the user pronounces a word, the word should match the speech sample pronounced with a normal range of nasalance. If a word comes from the top line, the user should pronounce the word with a high nasalance; if a word comes from the bottom line, the user should pronounce the word with a nasalance. The more words pronounced match the speech sample, the lower the severity of speech impairment; the less words pronounced match the speech sample, the higher the severity of speech impairment.

In addition to providing the serious game, information of the user, resonance training, and information of treatment progress, the application unit 300 has a real-time speech signal plot 330 to display measurements of oral sound, nasal sound, and nasalance in real time.

While the present invention has been described in connection with what is presently considered to be practical exemplary embodiments, it is to be understood that the invention is not limited to the disclosed embodiments, but, on the contrary, it will be apparent to those skilled in the art that various changes, substitutions, and alterations can be made therein without departing from the spirit of the invention.

DESCRIPTION OF SYMBOLS

100: hardware unit
110: microphone unit
111: adjustment of length in a horizontal direction
113: separator without touching the philtrum
120: head gear unit
130: speaker unit
131: power on/off switch button
132: LED for identification of power on/off
133: USB port for power supply
134: rechargeable battery
200: computational unit
210: sound signal amplification unit
220: sound signal conversion unit
230: noise filtering unit
240: nasalance adjustment unit
300: application unit
310: jump game
320: word articulation game 330: real-time speech signal plot
400: database unit
500: wireless transmission/reception unit

What is claimed is:

1. A smart nasometer comprising:
    a hardware unit configured to be worn on a head of a user for measuring nasal and oral sounds of the user and providing feedback to the user; and
    a computational unit for recovering and processing speech signals of the nasal and oral sounds measured by the hardware unit,
    wherein the hardware unit includes:
    a microphone unit for separately measuring the nasal and oral sounds in a non-touched state of the user's philtrum,
    wherein the computational unit includes:
    a nasalance adjustment unit for adjusting a nasalance of the nasal and oral sounds measured by the microphone unit.

2. The nasometer according to claim 1, further comprising:
    an application unit including a game for providing feedback to the user using the speech signals processed through the computational unit; and
    a database unit for storing user data generated by the application unit and providing feedback to the user or a clinician.

3. The nasometer according to claim 2, further comprising:
    a wireless transmitting and receiving unit wirelessly transmitting and receiving the speech signals processed by the computational unit and interworking with the hardware unit and the database unit.

4. The nasometer according to claim 1, wherein the microphone unit is adjustable to a distance from the user's face.

5. The nasometer according to claim 1, wherein the microphone unit includes:
    a separator extending in a horizontal direction and positioned so as not to be touched by the user's philtrum; and two microphones respectively disposed on an upper and lower sides of the separator and separately measuring the nasal and oral sound signals.

6. The nasometer according to claim 5, wherein
    the microphone unit includes a body to which the two microphones are supported, and
    the separator is detachably attached to the body.

7. The nasometer according to claim 5, wherein
    the nasalance adjustment unit includes an algorithm for adjusting a nasalance of the speech signal measured by the microphone unit when the separator is not touched to the user's philtrum so that there is no difference between the nasalance of the speech signal measured by the microphone unit when the separator is not touched to the user's philtrum and a nasalance of a speech signal measured by the microphone unit when the separator is touched to the user's philtrum.

8. The nasometer according to claim 7, wherein
    a sound energy adjustment ratio is a value obtained by dividing a sound energy of a first speech signal measured by the microphone unit in a state where the separator is touched to the user's philtrum by a sound energy of a second speech signal measured by the microphone unit in a state where the separator is not touched to the user's philtrum, and
    the algorithm adjusts a nasalance of the second speech signal so that there is no difference between a nasalance of the first speech signal and the nasalance of the second speech signal by multiplying the sound energy of the second speech signal by the sound energy adjustment ratio.

9. The nasometer according to claim 1, wherein
    the computational unit further includes:
    a sound signal amplification unit for amplifying the speech signals;
    a sound signal conversion unit for converting the speech signals into decibel (dB) values; and
    a noise filtering unit for excluding a decibel value that is not in a predetermined range of decibel value.

10. The nasometer according to claim 9, wherein
    the sound signal conversion unit converts the speech signals into decibel (dB) values by using a logarithmic function.

11. The nasometer according to claim 10, wherein
    the noise filtering unit removes a value of less than 50 dB from the nasal and oral sounds in the microphone unit.

12. The nasometer according to claim 2, wherein
    the application unit controls the game implemented in an electronic device through a real-time speech signal processed in the computational unit in cooperation with the electronic device.

13. The nasometer according to claim 1, wherein
    the hardware unit includes:
    a head gear unit which is adjustable in length and angle in accordance with a size of the head of the user; and
    a speaker unit configured to cover an ear of the user, and provide feedback on the speech signals processed by the computational unit in real time.

* * * * *